US012621801B2

(12) United States Patent
Hong

(10) Patent No.: US 12,621,801 B2
(45) Date of Patent: May 5, 2026

(54) METHOD AND APPARATUS FOR DISTINGUISHING PAGING CAPABILITY OF BASE STATION, AND COMMUNICATION DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 296 days.

(21) Appl. No.: 18/286,222

(22) PCT Filed: Apr. 13, 2021

(86) PCT No.: PCT/CN2021/087075
§ 371 (c)(1),
(2) Date: Oct. 9, 2023

(87) PCT Pub. No.: WO2022/217471
PCT Pub. Date: Oct. 20, 2022

(65) Prior Publication Data
US 2024/0196372 A1 Jun. 13, 2024

(51) Int. Cl.
*H04W 68/02* (2009.01)

(52) U.S. Cl.
CPC ................................. *H04W 68/025* (2013.01)

(58) Field of Classification Search
CPC . H04W 68/025; H04W 76/27; H04W 68/005; H04W 68/02
See application file for complete search history.

(56) References Cited

U.S. PATENT DOCUMENTS

| | | | |
|---|---|---|---|
| 12,356,370 B2 * | 7/2025 | Sha | H04W 36/0016 |
| 2013/0115993 A1 * | 5/2013 | Jain | H04W 4/70 455/517 |

(Continued)

FOREIGN PATENT DOCUMENTS

| | | |
|---|---|---|
| CN | 102448167 A | 5/2012 |
| CN | 103167451 A | 6/2013 |

(Continued)

OTHER PUBLICATIONS

ZTE Corporation etc. "Consideration on the Paging Cause", 3GPP TSG-RAN WG2 Meeting #112-e R2-2009624, Online, Nov. 13, 2020 (7p ). (Year: 2020).*

(Continued)

*Primary Examiner* — Yuwen Pan
*Assistant Examiner* — Swati Jain
(74) *Attorney, Agent, or Firm* — Arch & Lake LLP; Hao Tan; Shen Wang

(57) ABSTRACT

The present disclosure provides a method, a communication device and a non-transitory computer storage medium for distinguishing paging capability of a base station, and a communication device, belonging to the technical field of wireless communication. The method includes: a terminal device receives paging signaling of a base station, and acquires a paging cause information element in the paging signaling, where the paging cause information element is used to carry a paging cause. In such a way, even if the base station does not send the paging cause to the terminal device, the terminal device can still determine the paging capability of the base station according to the paging cause information element, so as to perform subsequent actions or corresponding determinations according to the paging capability of the base station.

9 Claims, 5 Drawing Sheets

Receive paging signaling from the base station — 301

Acquire a paging cause information element in the paging signaling, where the paging cause information element is used to carry a paging cause — 302

Determine whether the paging cause information element includes a preset identifier — 303

In response to that the paging cause information element includes the preset identifier, and the paging cause information element does not include the paging cause, determine that the base station is capable of sending the paging cause but does not send the paging cause — 304

(56) References Cited

U.S. PATENT DOCUMENTS

| | | | | | |
|---|---|---|---|---|---|
| 2019/0313365 | A1* | 10/2019 | Islam | .................... | H04W 4/021 |
| 2021/0014822 | A1* | 1/2021 | Gurumoorthy | ....... | H04W 68/02 |
| 2021/0352619 | A1* | 11/2021 | Ryu | ...................... | H04W 68/02 |
| 2022/0116909 | A1* | 4/2022 | Jung | ................. | H04W 74/0833 |
| 2023/0038897 | A1* | 2/2023 | Li | .......................... | H04W 68/02 |
| 2023/0269702 | A1* | 8/2023 | Zhang | .................. | H04W 68/12 455/558 |
| 2024/0023065 | A1* | 1/2024 | Hong | .................... | H04W 68/02 |
| 2024/0172178 | A1* | 5/2024 | Ryu | ...................... | H04W 68/02 |
| 2024/0196364 | A1* | 6/2024 | Hong | ................. | H04W 68/005 |

FOREIGN PATENT DOCUMENTS

| | | | | | | |
|---|---|---|---|---|---|---|
| CN | 107872859 | A | * | 4/2018 | ............ | H04W 68/00 |
| CN | 110730445 | A | * | 1/2020 | ............ | H04W 8/183 |
| CN | 111836219 | A | * | 10/2020 | ........ | H04M 1/72463 |
| CN | 112166634 | A | | 1/2021 | | |
| WO | 2020185949 | A1 | | 9/2020 | | |

OTHER PUBLICATIONS

Vivo, "Discussion on Supporting of Paging Cause",3GPP TSG-RAN WG2 Meeting #113-e, e-Meeting, Jan. 25-Feb. 5, 2021, R2-2100476, 5 pages. (Year: 2021).*
Samsung, "Discussion on support of paging cause for Multi-SIM devices", 3GPP TSG-RAN WG2 Meeting #113-e, Online, dated on Jan. 25-Feb. 5, 2021, R2-2100200, (3p). (Year: 2021).*
State Intellectual Property Office of the People's Republic of China, Office Action and Search Report Issued in Application No. 2021800011004, dated on Apr. 6, 2022 with English translation, (17p).
State Intellectual Property Office of the People's Republic of China, Office Action and Search Report Issued in Application No. 2021800011004, dated on Oct. 10, 2022 with English translation, (13p).
State Intellectual Property Office of the People's Republic of China, Decision of Rejection Issued in Application No. 2021800011004, dated on Feb. 25, 2023 with English translation, (15p).
Samsung, "Discussion on support of paging cause for Multi-SIM devices", 3GPP TSG-RAN WG2 Meeting #113-e, Online, dated on Jan. 25-Feb. 5, 2021, R2-2100200, (3p).
Vivo,"Discussion on Supporting of Paging Cause",3GPP TSG-RAN WG2 Meeting #113-e, e-Meeting, Jan. 25-Feb. 5, 2021, R2-2100476, 5 pages.
Vivo, "Introduction of Paging Cause", 3GPP TSG-RAN WG2 Meeting #113bis-e, e-Meeting, Apr. 12-20, 2021, R2-2103348, 5 pages.
ISA State Intellectual Property Office of the People's Republic of China, Written Opinion of the International Searching Authority Issued in Application No. PCT/CN2021/087075, Jan. 14, 2022, WIPO, 6 pages.
International Search Report issued in Application No. PCT/CN2021/087075, dated Jan. 14, 2022, with English translation,(4p).
ZTE Corporation etc. "Consideration on the Paging Cause", 3GPP TSG-RAN WG2 Meeting #112-e R2-2009624 Online, Nov. 2-13, 2020 Nov. 13, 2020, (7p).

* cited by examiner

Send paging signaling to a terminal
device; where the terminal device
acquires a paging cause information
element in the paging signaling, and the
paging cause information element is used
to carry a paging cause

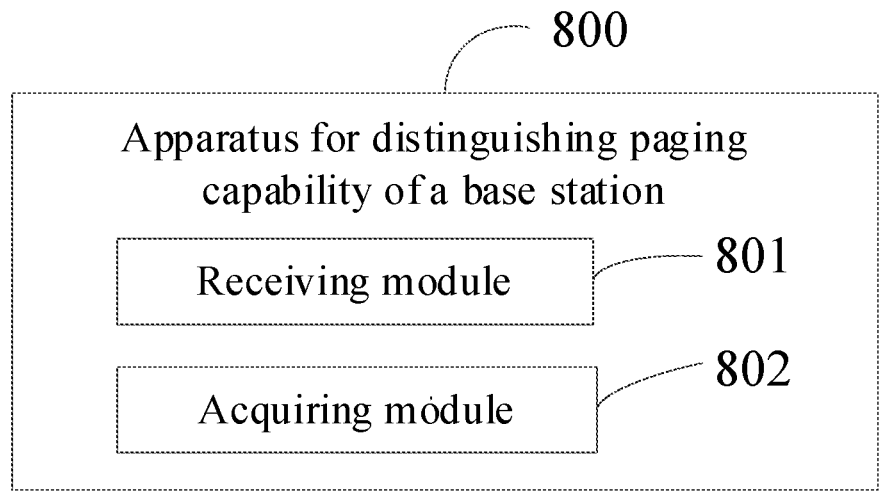

Apparatus for distinguishing paging
capability of a base station

Receiving module — 801

Acquiring module — 802

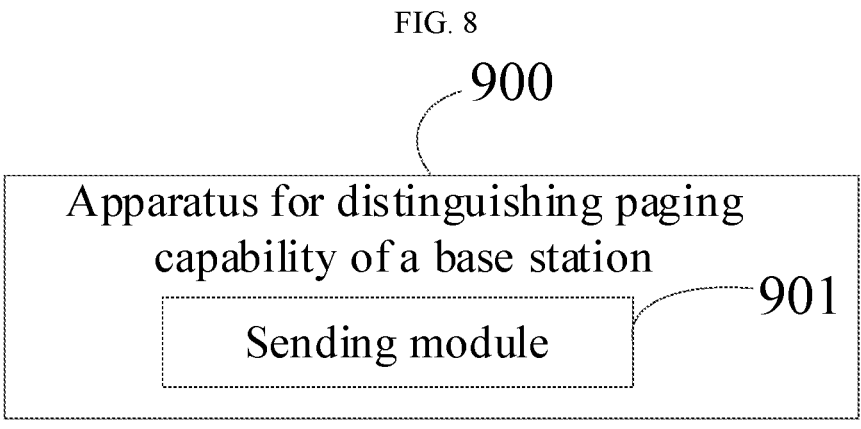

Apparatus for distinguishing paging
capability of a base station

Sending module — 901

FIG. 9

METHOD AND APPARATUS FOR DISTINGUISHING PAGING CAPABILITY OF BASE STATION, AND COMMUNICATION DEVICE

CROSS-REFERENCE TO RELATED APPLICATIONS

This application is a US national phase application of International Application No. PCT/CN2021/087075, filed on Apr. 13, 2021, which is hereby incorporated by reference in its entirety for all purposes.

TECHNICAL FIELD

The present disclosure relates to the technical field of wireless communication, and in particular, to a method and an apparatus for distinguishing paging capability of a base station, and a communication device.

BACKGROUND

With continuous development of wireless communication technology, more and more users hold terminal devices with multiple communication cards. At present, a paging cause of a certain communication card can be sent to a terminal device with multiple communication cards through a base station, so that the terminal device can perform subsequent actions according to the paging cause, such as responding to the paging. However, in some scenarios, the base station may not send the paging cause to the terminal device. In such case, the terminal device will not be able to determine paging capability of the base station, so the terminal device will not be able to carry out subsequent actions, which will result in failure to establish a service.

SUMMARY

A first aspect of embodiments of the present disclosure provides a method for distinguishing paging capability of a base station, performed by a terminal device, including: receiving paging signaling from the base station; acquiring a paging cause information element in the paging signaling, where the paging cause information element is used to carry a paging cause.

Alternatively, the method further includes: determining the paging capability of the base station according to the paging cause information element.

Alternatively, the paging signaling does not include the paging cause information element, and the method further includes: determining that the base station is not capable of sending the paging cause.

Alternatively, determining the paging capability of the base station according to the paging cause information element includes: determining that the paging cause information element includes a preset identifier, and the paging cause information element does not include the paging cause, determining that the base station is capable of sending the paging cause but does not send the paging cause.

Alternatively, the paging cause information element includes the paging cause, and the method further includes: extracting the paging cause in the paging cause information element.

Alternatively, determining that the paging cause information element includes a preset identifier includes: determining, at a preset position, that the preset identifier is presented.

Alternatively, the paging signaling does not include the paging cause information element, and determining the paging capability of the base station according to the paging cause information element includes: determining the paging capability of the base station according to received system information of the base station.

Alternatively, determining the paging capability of the base station according to received system information of the base station includes: determining, according to the system information, that the base station is capable of sending the paging cause, and the paging signaling does not include the paging cause information element, determining that the base station is capable of sending the paging cause but does not send the paging cause.

Alternatively, the method further includes: determining that the base station is capable of sending the paging cause but does not send the paging cause, and sending paging cause request information to the base station, so as to further request the base station to send the paging cause.

Alternatively, the method further includes: determining that the base station is capable of sending the paging cause but does not send the paging cause, and determining that the paging signaling is for non-voice paging.

Alternatively, the terminal device is provided with multiple communication cards, and the paging signaling is for a communication card in a non-connected state in the terminal device.

Alternatively, the paging cause is voice paging.

A second aspect of embodiments of the present disclosure provides another method for distinguishing paging capability of a base station, performed by the base station, including: sending paging signaling to a terminal device; where the terminal device acquires a paging cause information element in the paging signaling, and the paging cause information element is used to carry a paging cause.

A third aspect of embodiments of the present disclosure provides an apparatus for distinguishing paging capability of a base station, applied to a terminal device, including: a receiving module, configured to receive paging signaling from the base station; an acquiring module, configured to acquire a paging cause information element in the paging signaling, where the paging cause information element is used to carry a paging cause.

A fourth aspect of embodiments of the present disclosure provides an apparatus for distinguishing paging capability of a base station, applied to the base station, including: a sending module, configured to send paging signaling to a terminal device; where the terminal device acquires a paging cause information element in the paging signaling, and the paging cause information element is used to carry a paging cause.

A fifth aspect of embodiments of the present disclosure provides a communication device, including: a transceiver; a memory; and a processor connected to the transceiver and the memory respectively, configured to execute a computer-executable instruction stored on the memory to control the transceiver to transmit and receive radio signals and to implement the method for distinguishing paging capability of a base station according to a first aspect of the embodiments of the present disclosure or the method for distinguishing paging capability of a base station according to a second aspect of the embodiments of the present disclosure.

A sixth aspect of embodiments of the present disclosure provides a computer storage medium storing a computer-executable instruction; the computer-executable instruction is executed by a processor to implement the method for distinguishing paging capability of a base station according to a first aspect of the embodiments of the present disclosure or the method for distinguishing paging capability of a base station according to a second aspect of the embodiments of the present disclosure.

A seventh aspect of embodiments of the present disclosure provides a computer program product including a computer program, where the computer program is executed by a processor to implement the method for distinguishing paging capability of a base station according to a first aspect of the embodiments of the present disclosure or the method for distinguishing paging capability of a base station according to a second aspect of the embodiments of the present disclosure.

According to the method and apparatus for distinguishing paging capability of a base station, and the communication device, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

Additional aspect and advantages of the present disclosure will be set forth in part in the following description, and in part will be obvious from the following description, or may be learned by practice of the present disclosure.

BRIEF DESCRIPTION OF DRAWINGS

The above-mentioned and/or additional aspects and advantages of the present disclosure will be apparent and easily understood from the following description of embodiments with reference to the accompanying drawings.

FIG. 7 is a schematic flowchart of another method for distinguishing paging capability of a base station provided by embodiments of the present disclosure.

FIG. 8 is a schematic structural diagram of an apparatus for distinguishing paging capability of a base station provided by embodiments of the present disclosure.

FIG. 9 is a schematic structural diagram of another apparatus for distinguishing paging capability of a base station provided by embodiments of the present disclosure.

DETAILED DESCRIPTION

Figure 1:
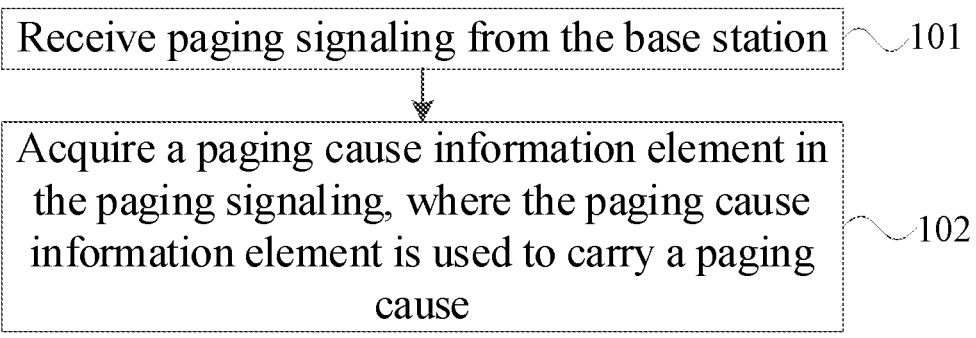
FIG. 1 is a schematic flowchart of a method for distinguishing paging capability of a base station provided by embodiments of the present disclosure.

Description will now be made in detail to illustrative embodiments, examples of which are shown in the accompanying drawings. When the following description refers to the drawings, unless otherwise indicated, same reference numerals in different drawings indicate the same or similar elements. Embodiments described in the following illustrative embodiments do not represent all embodiments consistent with the present disclosure. In contrary, they are merely examples of methods and apparatuses consistent with some aspects of the embodiments of present disclosure as described in detail in the appended claims.

The terminologies used in the embodiments of the present disclosure are for the purpose of describing specific embodiments only and are not intended to limit the embodiments of the present disclosure. Singular forms "a" and "the" used in the embodiments of the present disclosure and the appended claims are also intended to include plural forms, unless the context clearly indicates other meaning. It should also be understood that the term "and/or" as used herein refers to and includes any or all possible combinations of one or more associated listed items.

It should be understood that although the terms "first", "second", "third", etc. may be used to describe various information in the embodiments of the present disclosure, these information should not be limited to these terms. These terms are only used to distinguish a same type of information from each other. For example, without departing from the scope of the embodiments of the present disclosure, the first information may also be referred to as the second information, and similarly, the second information may also be referred to as the first information. Depending on the context, the words "if" and "when" as used herein can be interpreted as "in a case" or "upon" or "in response to determining".

Hereinafter, embodiments of the present disclosure will be described in detail, examples of which are illustrated in the accompanying drawings, where the same or similar reference numerals indicate the same or similar elements throughout. The embodiments described below by referring to the accompanying drawings are exemplary and are intended to explain the present disclosure, and should not be construed as limiting the present disclosure.

At present, processing ways for a terminal device with multiple communication cards are mainly based on implementation of terminal manufacturers, which may lead to many different terminal behaviors and processing ways, such as dual sim single standby, dual sim dual standby single pass, dual sim dual standby dual pass, etc., and may also lead to some problems, such as collision of paging moments of different communication cards, which may lead to the terminal device with multiple communication cards being unable to receive or miss paging signaling sent by a base station, and thus a service cannot be established. In another case, when a connected communication card 1 (SIM (Subscriber Identity Module) #1) in the terminal device with multiple communication cards is communicating with a network #1, an idle SIM #2 receives paging signaling sent by a network #2, but the SIM #2 is not sure whether to respond to the paging or not. In another case, when the paging signaling sent by the base station does not include a paging cause, the SIM #2 will be unable to learn paging capability of the base station, hence will be unable to carry out subsequent actions.

Aiming at the above problems, the present disclosure provides a method and an apparatus for distinguishing paging capability of a base station, and a communication device.

FIG. 1 is a schematic flowchart of a method for distinguishing paging capability of a base station provided by embodiments of the present disclosure. The method for distinguishing the paging capability of the base station can be performed by a terminal device.

The terminal device can be a device that provides voice and/or data connectivity to users, a hand-held device with wireless connection function, or other processing devices connected to a wireless modem, etc. In different systems, a name of the terminal device may be different. For example, in a 5G system, the terminal device may be called a UE (User Equipment). Wireless terminal devices can communicate with one or more CNs (Core Networks) via a RAN (Radio Access Network). Wireless terminal devices can be mobile terminal devices, such as mobile phones (or "cellular" phones) and computers with mobile terminal devices, such as portable, pocket-sized, hand-held, computer-built or vehicle-mounted mobile devices, which exchange voice and/or data with the wireless access network.

For example, the terminal device can be PCS (Personal Communication Service) telephone, cordless telephone, SIP (Session Initiated Protocol) telephone, WLL (Wireless Local Loop) station, PDA (Personal Digital Assistant) and other devices. A wireless terminal device can also be called a system, a subscriber unit, a subscriber station, a Mobile station, a mobile platform, a remote station, an access point, a remote a terminal, an access terminal, a user terminal, a user agent, and a user device, which is not limited in the embodiments of the present disclosure.

As shown in FIG. 1, a method for distinguishing paging capability of a base station may include following steps:

Step 101, receiving paging signaling from the base station.

The base station may include a plurality of cells providing services to a terminal device. According to different specific application scenarios, each cell may include a plurality of TRPs (Transmission Reception Point, or Transmit Receive Point), or a device communicating with a wireless terminal device through one or more sectors on an air interface in an access network, or other names. The base station related to the embodiments of the present disclosure may be a BTS (Base Transceiver Station) in GSM (Global System for Mobile Communications) or CDMA (Code Division Multiple Access). The base station may also be a base station (NodeB) in WCDMA (Wideband Code Division Multiple Access), or an evolutional Node B (abbreviated as eNB or e-NodeB) in an LTE (long-term evolution) system, a 5G base station (abbreviated as gNB) in a 5G network architecture (next generation system), or a HeNB (Home evolved Node B), a relay node, a home base station (femto), a pico base station, etc.

In the embodiments of the present disclosure, the terminal device can receive the paging signaling sent by the base station.

Step 102, acquiring a paging cause information element in the paging signaling, where the paging cause information element is used to carry a paging cause.

In an embodiment of the present disclosure, when the terminal device is provided with one communication card, the paging cause can be a cause for paging the one communication card; and when the terminal device is provided with multiple communication cards, the paging cause can be a cause for paging one of the multiple communication cards, such as a communication card in a non-connected state (that is, the paging signaling is for the communication card in the non-connected state in the terminal device).

For example, when a mobile phone number in the terminal device is paged, a reason for paging the mobile phone number can be marked, that is, a paging cause is marked. For example, the marked paging cause may be voice paging, data service download paging, system short message group-sending (i.e., short message system information) paging, etc.

The paging cause can be determined by at least one of following ways: the base station directly determines the paging cause through the terminal device, for example, the base station determines reasons for calling a certain mobile phone number through the terminal device; the base station acquires the paging cause through a core network, for example, the core network can directly inform the base station of the paging cause, or the base station can determine the paging cause by querying a data base of the core network; the base station can determine the paging cause by querying neighbor cells.

In an embodiment of the present disclosure, the paging signaling may include the paging cause information element, and the paging cause information element is used to carry the paging cause, that is, the paging cause information element can record the paging cause.

As an example, the paging signaling may include a paging record information element, a new information element (referred to as the paging cause information element in the embodiments of the present disclosure) can be added in the paging record information element to indicate the paging cause. For example, a pagingCause-r17 information element can be added in a PagingRecord information element to indicate the paging cause, where the pagingCause-r17 information element can indicate the paging cause through a way of enumerating.

As an example, the paging signaling may include:

```
[[
  pagingCause-r17   ENUMERATED { voice, spare1, spare2, spare3,
spare4, spare5, spare6, spare7}   OPTIONAL -- Need ON
]]
```

ENUMERATED indicates an enumeration type, and within brackets behind ENUMERATED are specific examples of each type, that is, the paging signaling can include one of the enumeration types within the brackets, and OPTIONAL indicates that this field may not be presented in an actual paging signaling.

In an embodiment of the present disclosure, after receiving the paging signaling, the terminal device can acquire the paging cause information element in the paging signaling.

In an embodiment of the present disclosure, after acquiring the paging cause information element, the terminal device can determine paging capability of the base station according to the paging cause information element, where the paging capability of the base station indicates whether the base station is capable of sending the paging cause, so that the terminal device can perform subsequent actions or corresponding determinations according to the paging capability of the base station.

According to the method for distinguishing paging capability of a base station, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

Figure 2:
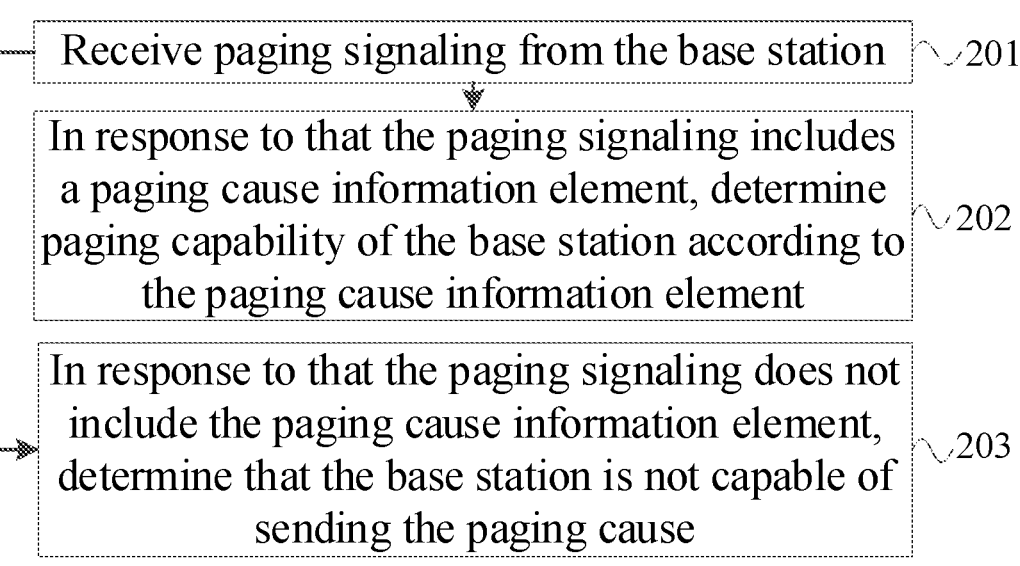
FIG. 2 is a schematic flowchart of another method for distinguishing paging capability of a base station provided by embodiments of the present disclosure.

Embodiments of the present disclosure provide another method for distinguishing paging capability of a base station, and FIG. 2 is a schematic flowchart of the other method for distinguishing paging capability of a base station provided by embodiments of the present disclosure. The method for distinguishing the paging capability of the base station can be performed by a terminal device. The method for distinguishing paging capability of a base station can be performed independently, or in combination with any one of the embodiments or any possible implementations in the embodiments of the present disclosure, or in combination with any technical solution in related arts.

As shown in FIG. 2, a method for distinguishing paging capability of a base station may include following steps:

Step 201, receiving paging signaling from the base station.

Step 202, in response to that the paging signaling includes a paging cause information element, determining paging capability of the base station according to the paging cause information element.

In an embodiment of the present disclosure, the paging cause information element is used to carry a paging cause.

In an embodiment of the present disclosure, the paging cause may aim to a voice service, that is, the paging cause may be voice paging.

It shall be understood that, the paging cause may also aim to other services, such as data service download paging, system short message group-sending (i.e., short message system information) paging, etc., which is not limited by the present disclosure.

In an embodiment of the present disclosure, steps 201 and 202 can be implemented through any manner in the embodiments of the present disclosure, which is not limited by the embodiment of the present disclosure, and will not be repeated here.

Step 203, in response to that the paging signaling does not include the paging cause information element, determining that the base station is not capable of sending the paging cause.

In an embodiment of the present disclosure, if the base station does not support to send the paging cause, that is, the base station is not capable of sending the paging cause, the paging signaling sent to the terminal device by the base station may not include the paging cause, that is, the base station may not send the paging cause information element.

Thus, in the embodiment of the present disclosure, when the paging signaling does not include the paging cause information element, the terminal device can determine that the base station is not capable of sending the paging cause.

According to the method for distinguishing paging capability of a base station, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

It shall be noted that, the above implementations may be performed independently or in combination with each other, which is not limited by the embodiments of the present disclosure.

Figure 3:
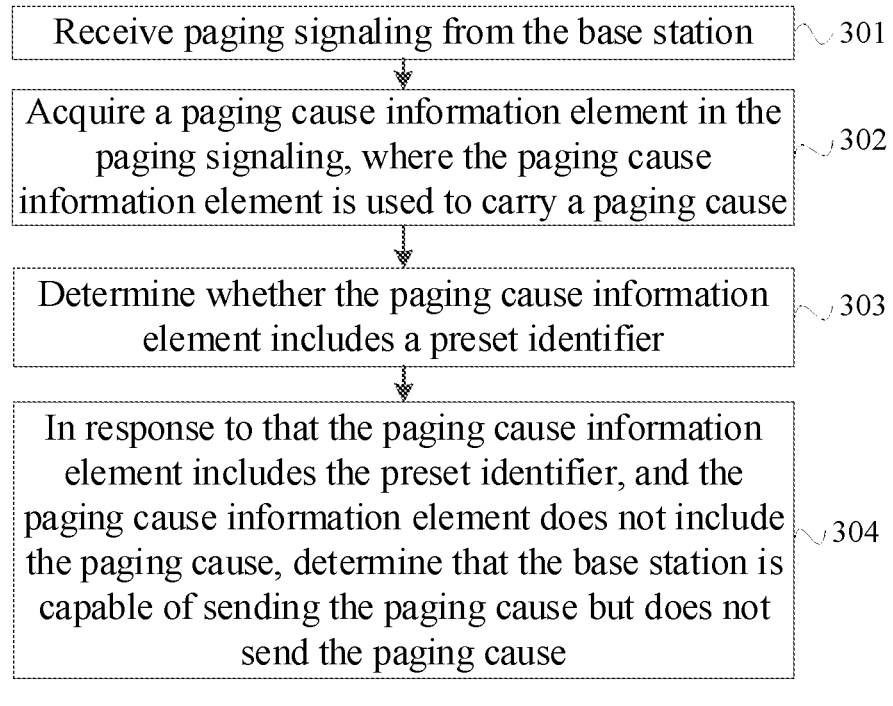
FIG. 3 is a schematic flowchart of another method for distinguishing paging capability of a base station provided by embodiments of the present disclosure.

Embodiments of the present disclosure provide another method for distinguishing paging capability of a base station, and FIG. 3 is a schematic flowchart of the other method for distinguishing paging capability of a base station provided by embodiments of the present disclosure. The method for distinguishing the paging capability of the base station can be performed by a terminal device. The method for distinguishing paging capability of a base station can be performed independently, or in combination with any one of the embodiments or any possible implementations in the embodiments of the present disclosure, or in combination with any technical solution in related arts.

As shown in FIG. 3, a method for distinguishing paging capability of a base station may include following steps:

Step 301, receiving paging signaling from the base station.

Step 302, acquiring a paging cause information element in the paging signaling, where the paging cause information element is used to carry a paging cause.

In an embodiment of the present disclosure, steps 301 and 302 can be implemented through any manner in the embodiments of the present disclosure, which is not limited by the embodiment of the present disclosure, and will not be repeated here.

Step 303, determining whether the paging cause information element includes a preset identifier.

In an embodiment of the present disclosure, when determining that the paging signaling includes the paging cause information element, the terminal device can further determine whether the paging cause information element includes the preset identifier. That is, in the present disclosure, the preset identifier can be added in the paging cause information element to indicate paging capability of the base station.

In an embodiment of the present disclosure, it can be determined that whether the preset identifier is presented at a preset position of the paging cause information element, and when the preset identifier is presented at the preset position, it can be determined that the paging cause information element includes the preset identifier.

As an example, the paging signaling may include a new information element including certain content, which is referred to as the paging cause information element in the embodiments of the present disclosure, and certain content included in the paging cause information element is taken as the preset identifier. For example, it is taken as an example that the preset position is a first reserved information "sparel" in the paging cause information element, the "sparel" can be defined as void, and the preset identifier can be the void.

Step 304, in response to that the paging cause information element includes the preset identifier, and the paging cause information element does not include the paging cause, determining that the base station is capable of sending the paging cause but does not send the paging cause.

In an embodiment of the present disclosure, when the terminal device determines that the paging cause information element includes the preset identifier, and the paging cause information element does not include the paging cause, it can be determined that the base station is capable of sending the paging cause but does not send the paging cause.

In an embodiment of the present disclosure, when determining that the paging cause information element includes the paging cause, the terminal device can extract the paging cause in the paging cause information element, so as to perform subsequent actions (such as responding paging) according to the paging cause.

According to the method for distinguishing paging capability of a base station, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

It shall be noted that, the above implementations may be performed independently or in combination with each other, which is not limited by the embodiments of the present disclosure.

Figure 4:
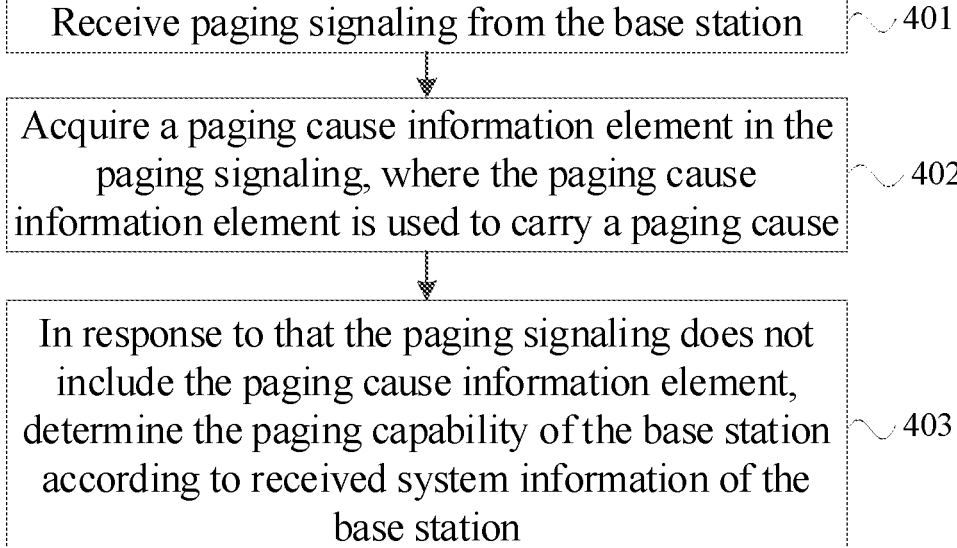
FIG. 4 is a schematic flowchart of another method for distinguishing paging capability of a base station provided by embodiments of the present disclosure.

Embodiments of the present disclosure provide another method for distinguishing paging capability of a base station, and FIG. 4 is a schematic flowchart of the other method for distinguishing paging capability of a base station provided by embodiments of the present disclosure. The method for distinguishing the paging capability of the base station can be performed by a terminal device. The method for distinguishing paging capability of a base station can be performed independently, or in combination with any one of the embodiments or any possible implementations in the embodiments of the present disclosure, or in combination with any technical solution in related arts.

As shown in FIG. 4, a method for distinguishing paging capability of a base station may include following steps:

Step 401, receiving paging signaling from the base station.

Step 402, acquiring a paging cause information element in the paging signaling, where the paging cause information element is used to carry a paging cause.

In an embodiment of the present disclosure, steps 401 and 402 can be implemented through any manner in the embodiments of the present disclosure, which is not limited by the embodiment of the present disclosure, and will not be repeated here.

Step 403, in response to that the paging signaling does not include the paging cause information element, determining the paging capability of the base station according to received system information of the base station.

In an embodiment of the present disclosure, when determining that the paging signaling does not include the paging cause information element, the terminal device can determine the paging capability of the base station according to received system information of the base station. The system information is used to indicate whether the base station is capable of sending the paging cause.

In an embodiment of the present disclosure, when determining, according to the system information, that the base station is capable of sending the paging cause, and the paging signaling does not include the paging cause information element, the terminal device can determine that the base station is capable of sending the paging cause but does not send the paging cause.

As an example, the base station can send the system information to the terminal device, where the system information is used to indicate that the base station is capable of sending the paging cause, that is, the base station can inform its own capability of sending the paging cause through the system information. Correspondingly, after acquiring the system information sent by the base station, the terminal device can determine that the base station is capable of sending the paging cause but does not send the paging cause.

According to the method for distinguishing paging capability of a base station, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

It shall be noted that, the above implementations may be performed independently or in combination with each other, which is not limited by the embodiments of the present disclosure.

Figure 5:
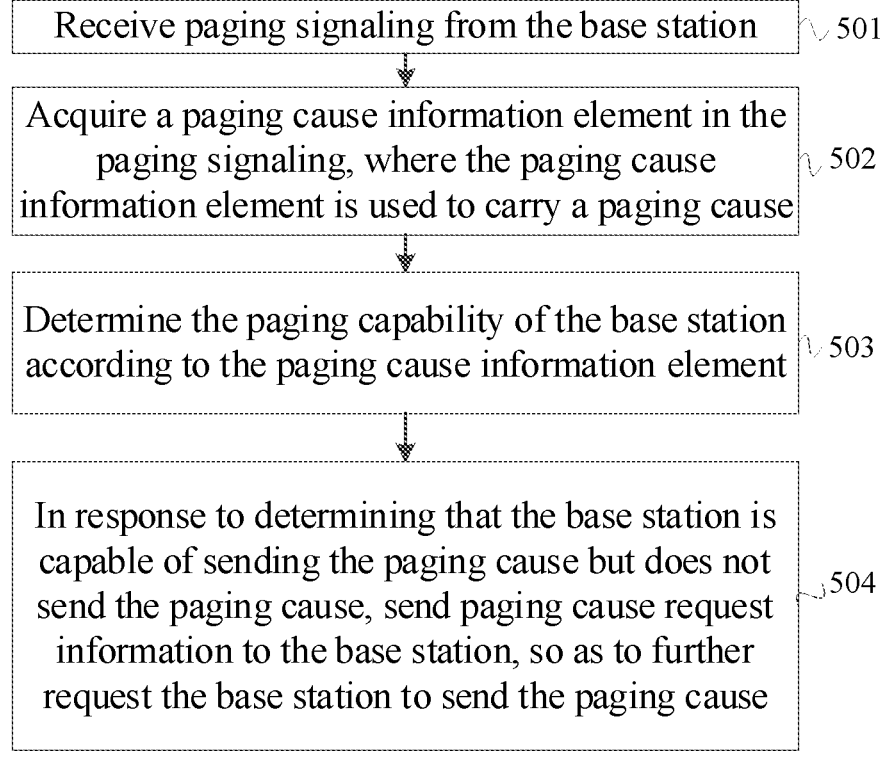
FIG. 5 is a schematic flowchart of another method for distinguishing paging capability of a base station provided by embodiments of the present disclosure.

Embodiments of the present disclosure provide another method for distinguishing paging capability of a base station, and FIG. 5 is a schematic flowchart of the other method for distinguishing paging capability of a base station provided by embodiments of the present disclosure. The method for distinguishing the paging capability of the base station can be performed by a terminal device. The method for distinguishing paging capability of a base station can be performed independently, or in combination with any one of the embodiments or any possible implementations in the embodiments of the present disclosure, or in combination with any technical solution in related arts.

As shown in FIG. 5, a method for distinguishing paging capability of a base station may include following steps:

Step 501, receiving paging signaling from the base station.

Step 502, acquiring a paging cause information element in the paging signaling, where the paging cause information element is used to carry a paging cause.

Step 503, determining the paging capability of the base station according to the paging cause information element.

In an embodiment of the present disclosure, steps 501 and 503 can be implemented through any manner in the embodiments of the present disclosure, which is not limited by the embodiment of the present disclosure, and will not be repeated here.

Step 504, in response to determining that the base station is capable of sending the paging cause but does not send the paging cause, sending paging cause request information to the base station, so as to further request the base station to send the paging cause.

In an embodiment of the present disclosure, when determining that the base station is capable of sending the paging cause but does not send the paging cause, the terminal device can send the paging cause request information to the base station, where the paging cause request information is used to request the base station to send the paging cause. In such way, a success rate for the terminal device to learn the paging cause can be improved, so that the terminal device can carry out subsequent actions (such as responding paging) based on the paging cause.

According to the method for distinguishing paging capability of a base station, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

It shall be noted that, the above implementations may be performed independently or in combination with each other, which is not limited by the embodiments of the present disclosure.

Figure 6:
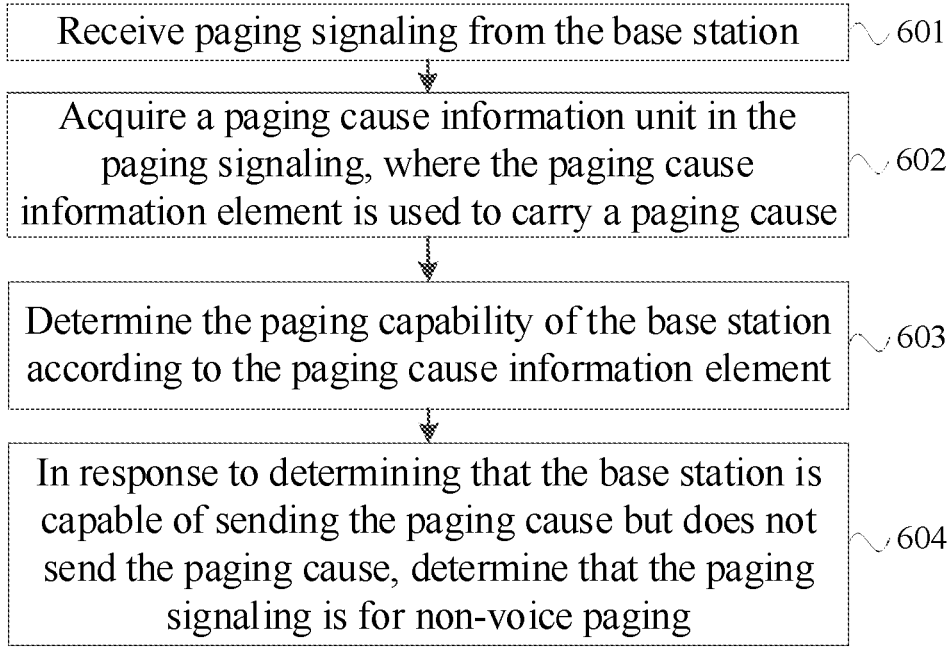
FIG. 6 is a schematic flowchart of another method for distinguishing paging capability of a base station provided by embodiments of the present disclosure.

Embodiments of the present disclosure provide another method for distinguishing paging capability of a base station, and FIG. 6 is a schematic flowchart of the other method for distinguishing paging capability of a base station provided by embodiments of the present disclosure. The method for distinguishing the paging capability of the base station can be performed by a terminal device. The method for distinguishing paging capability of a base station can be performed independently, or in combination with any one of the embodiments or any possible implementations in the embodiments of the present disclosure, or in combination with any technical solution in related arts.

As shown in FIG. 6, a method for distinguishing paging capability of a base station may include following steps:

Step 601, receiving paging signaling from the base station.

Step 602, acquiring a paging cause information element in the paging signaling, where the paging cause information element is used to carry a paging cause.

Step 603, determining the paging capability of the base station according to the paging cause information element.

In an embodiment of the present disclosure, steps 601 and 603 can be implemented through any manner in the embodiments of the present disclosure, which is not limited by the embodiment of the present disclosure, and will not be repeated here.

Step 604, in response to determining that the base station is capable of sending the paging cause but does not send the paging cause, determining that the paging signaling is for non-voice paging.

It shall be understood that, a paging instruction may aim for high-service-level paging (such as voice paging), or may aim for low-service-level paging (such as non-voice paging such as data service download paging and system short message information, etc.). Since the voice paging is of high importance, thus to improve service experience of a user, when the base station is capable of sending the paging cause, the base station can indicate the paging cause in the paging signaling, that is, the paging cause information element records the paging cause; and since non-voice paging is of low importance, to reduce signaling cost, when the base station is capable of sending the paging cause, the base station may not send the paging cause for the low-service-level paging, for example, the paging cause information element includes the preset identifier and does not include the paging cause.

Hence, in a possible implementation of the embodiment of the present disclosure, when determining that the base station is capable of sending the paging cause but does not send the paging cause, the terminal device can determine that the paging signaling is for non-voice paging. In such way, the terminal device can further distinguish or determine a reason why the base station does not send the paging cause, so as to perform subsequent operations according to the determined reason.

According to the method for distinguishing paging capability of a base station, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

It shall be noted that, the above implementations may be performed independently or in combination with each other, which is not limited by the embodiments of the present disclosure.

In an embodiment of the present disclosure, the base station can send the paging cause for a terminal device with multiple communication cards to the terminal device through the paging signaling.

In an embodiment of the present disclosure, the base station can send the paging cause to a communication card (such as a SIM card) that is able to or needs to receive the paging cause in the terminal device through the paging signaling.

In an embodiment of the present disclosure, for an LTE system or an NR (New Radio) system, the base station can implement indication of the paging cause by modifying a PagingRecord information element. For example, the paging cause can be indicated by adding a new information element (such as a pagingCause-r17 information element) in the PagingRecord information element, where the paging cause can be indicated through a way of enumerating.

In an embodiment of the present disclosure, when the base station does not support to send the paging cause, the base station will not send the new information element, that is, the paging signaling will not include the paging cause information element.

In an embodiment of the present disclosure, if the base station supports to send the paging cause, but the base station does not send the paging cause, the base station can indicate its own paging capability through at least one of the following ways: the base station can send a new information element including certain content, for example, define sparel as void; the base station can inform that itself is capable of sending the paging cause through system information, but the base station will not send the new information element (i.e., the paging cause information element).

Embodiments of the present disclosure provide another method for distinguishing paging capability of a base station, and FIG. 7 is a schematic flowchart of the other method for distinguishing paging capability of a base station provided by embodiments of the present disclosure. The method for distinguishing the paging capability of the base station can be performed by the base station.

As shown in FIG. 7, a method for distinguishing paging capability of a base station may include following steps:

Step 701, sending paging signaling to a terminal device; where the terminal device acquires a paging cause information element in the paging signaling, and the paging cause information element is used to carry a paging cause.

It shall be understood that illustration and description of the method for distinguishing paging capability of a base station performed by a terminal device in any embodiment of FIGS. 1-6 are also applicable to the method for distinguishing paging capability of a base station performed by the base station in the present embodiment, which have similar implementation principles, and will not be repeated here.

According to the method for distinguishing paging capability of a base station, the base station sends the paging signaling to a terminal device, and the terminal device acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

Corresponding to the method for distinguishing paging capability of a base station provided by embodiments of FIGS. 1-6 above, the present disclosure further provides an apparatus for distinguishing paging capability of a base station. Since the apparatus for distinguishing paging capability of a base station corresponds to the method for distinguishing paging capability of a base station provided by embodiments of FIGS. 1-6 above, implementations of the method for distinguishing paging capability of a base station are also applicable to the apparatus for distinguishing paging capability of a base station provided by the embodiments of the present disclosure, which will not be repeated in the embodiment of the present disclosure.

FIG. 8 is a schematic structural diagram of an apparatus for distinguishing paging capability of a base station provided by embodiments of the present disclosure. The apparatus can be applied to a terminal device.

As shown in FIG. 8, the apparatus 800 for distinguishing paging capability of a base station may include: a receiving module 801 and an acquiring module 802, where:

the receiving module 801 is configured to receive paging signaling from the base station;

the acquiring module 802 is configured to acquire a paging cause information element in the paging signaling, where the paging cause information element is used to carry a paging cause.

Alternatively, the apparatus 800 for distinguishing paging capability of a base station may further include:

a determining module, configured to determine the paging capability of the base station according to the paging cause information element.

Alternatively, the determining module is further configured to: in response to that the paging signaling does not include the paging cause information element, determine that the base station is not capable of sending the paging cause.

Alternatively, the determining module is specifically configured to: determining whether the paging cause information element includes a preset identifier; and in response to that the paging cause information element includes the preset identifier, and the paging cause information element does not include the paging cause, determining that the base station is capable of sending the paging cause but does not send the paging cause.

Alternatively, the apparatus 800 for distinguishing paging capability of a base station may further include:

an extracting module, configured to in response to that the paging cause information element includes the paging cause, extracting the paging cause in the paging cause information element.

Alternatively, the determining module is specifically configured to: determine, at a preset position, whether the preset identifier is presented.

Alternatively, the determining module is specifically configured to: in response to that the paging signaling does not include the paging cause information element, determine the paging capability of the base station according to received system information of the base station.

Alternatively, the determining module is specifically configured to: in response to determining, according to the system information, that the base station is capable of sending the paging cause, and the paging signaling does not include the paging cause information element, determine that the base station is capable of sending the paging cause but does not send the paging cause.

Alternatively, the apparatus 800 for distinguishing paging capability of a base station may further include:

a sending module, configured to in response to determining that the base station is capable of sending the paging cause but does not send the paging cause, send paging cause request information to the base station, so as to further request the base station to send the paging cause.

Alternatively, the determining module is further configured to: in response to determining that the base station is capable of sending the paging cause but does not send the paging cause, determine that the paging signaling is for non-voice paging.

Alternatively, the terminal device is provided with multiple communication cards, and the paging signaling is for one of the communication cards in a non-connected state in the terminal device.

Alternatively, the paging cause is voice paging.

According to the apparatus for distinguishing paging capability of a base station, the terminal device receives the paging signaling from the base station, and acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

Corresponding to the method for distinguishing paging capability of a base station provided by embodiments of FIG. 7 above, the present disclosure further provides an apparatus for distinguishing paging capability of a base station. Since the apparatus for distinguishing paging capability of a base station corresponds to the method for distinguishing paging capability of a base station provided by embodiments of FIG. 7 above, implementations of the method for distinguishing paging capability of a base station are also applicable to the apparatus for distinguishing paging capability of a base station provided by the embodiments of the present disclosure, which will not be repeated in the embodiment of the present disclosure.

FIG. 9 is a schematic structural diagram of another apparatus for distinguishing paging capability of a base station provided by embodiments of the present disclosure. The apparatus can be applied to the base station.

As shown in FIG. 9, the apparatus 900 for distinguishing paging capability of a base station may include: a sending module 901, where:

the sending module 901 is configured to send paging signaling to a terminal device;

where the terminal device acquires a paging cause information element in the paging signaling, and the paging cause information element is used to carry a paging cause.

According to the apparatus for distinguishing paging capability of a base station, the base station sends the paging signaling to a terminal device, and the terminal device acquires the paging cause information element in the paging signaling, where the paging cause information element is used to carry a paging cause. In such way, even if the base station does not send the paging cause to the terminal device, the terminal device can still determine the paging capability of the base station according to the paging cause information element, so as to perform subsequent actions or corresponding determinations according to the paging capability of the base station.

To implement the above embodiments, the present disclosure further provides a communication device.

The communication device provided by the embodiment of the present disclosure includes a processor, a transceiver, a memory and an executable program stored in the memory and executable by the processor, where the processor performs the above method when executing the executable program.

The communication device may be the aforementioned terminal device or base station.

The processor may include various types of storage media, which are non-temporary computer storage media, and can continue to remember the information stored on the communication device upon power failure. The communication device includes a terminal device or a base station.

The processor may be connected to the memory through a bus or the like for reading the executable programs stored on the memory, for example, as shown in at least one of FIGS. 1-7.

To implement the above embodiments, the present disclosure further provides a computer storage medium.

The computer storage medium provided by the embodiment of the present disclosure stores an executable program; after the executable program is executed by a processor, the aforementioned method can be realized, for example, the method as shown in at least one of FIGS. 1-7.

Figure 10:
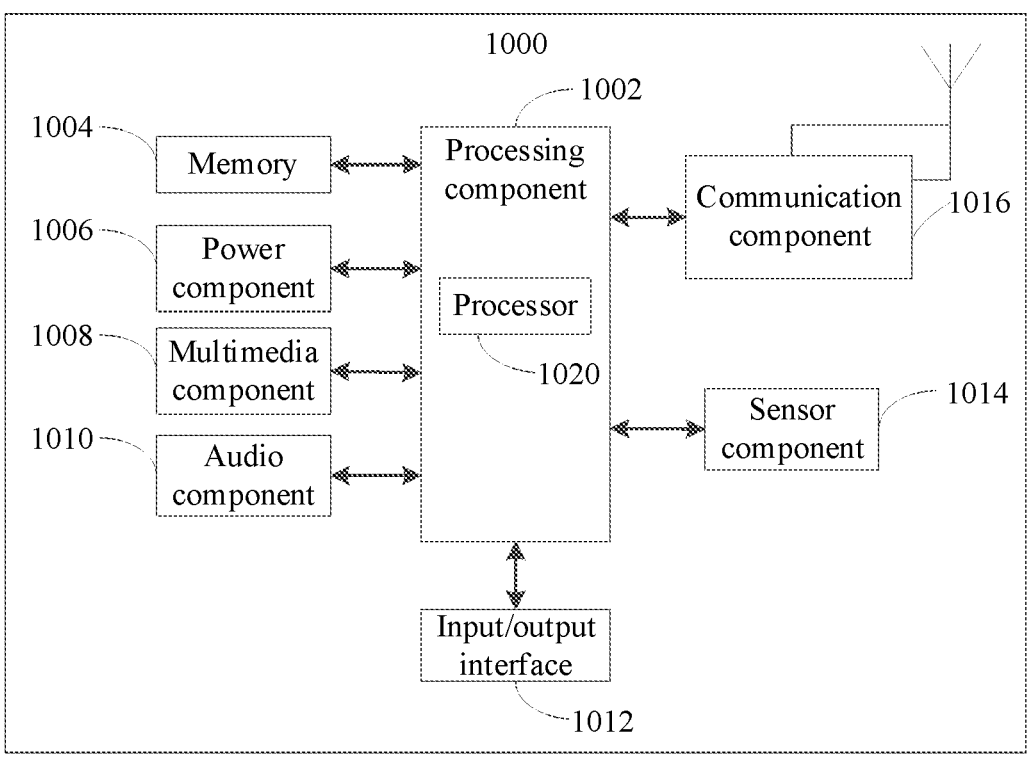
FIG. 10 is a block diagram of a terminal device provided by embodiments of the present disclosure.

FIG. 10 is a block diagram of a terminal device 1000 provided by embodiments of the present disclosure. For example, the terminal device 1000 may be a mobile phone, a computer, a digital broadcast user device, a messaging device, a game console, a tablet device, a medical device, a fitness device, a personal digital assistant, and the like.

Referring to FIG. 10, the terminal device 1000 may include at least one of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls overall operations of the terminal device 1000, such as operations associated with display, telephone call, data communication, camera operation and recording operation. The processing component 1002 may include at least one processor 1020 to execute instructions to complete all or part of steps of the method described above. In addition, the processing component 1002 can include at least one module to facilitate interaction between the processing component 1002 and other components. For example, the processing component 1002 can include a multimedia module to facilitate interaction between the multimedia component 1008 and the processing component 1002.

The memory 1004 is configured to store various types of data to support operations at the terminal device 1000. Examples of these data include instructions for any application or method operating on the terminal device 1000, contact data, phone book data, messages, pictures, videos, and the like. The memory 1004 can be realized by any type of volatile or non-volatile memory device or their combination, such as static random access memory (SRAM), electrically erasable programmable read-only memory (EE-PROM), erasable programmable read-only memory (EPROM), programmable read-only memory (PROM), read-only memory (ROM), magnetic memory, flash memory, magnetic disk or optical disk.

The power component 1006 provides power to various components of the terminal device 1000. The power component 1006 may include a power management system, at least one power supply, and other components associated with generating, managing and distributing power for the terminal device 1000.

The multimedia component 1008 includes a screen providing an output interface between the terminal device 1000 and the user. In some embodiments, the screen may include a liquid crystal display (LCD) and a touch panel (TP). If the screen includes a touch panel, the screen may be implemented as a touch screen to receive an input signal from a user. The touch panel includes at least one touch sensor to sense touch, sliding and gestures on the touch panel. The touch sensor may not only sense the boundary of a touch or sliding action, but also detect a wake-up time and pressure related to the touch or sliding operation. In some embodiments, the multimedia component 1008 includes a front camera and/or a rear camera. When the terminal device 1000 is in an operation mode, such as a shooting mode or a video mode, the front camera and/or the rear camera can receive external multimedia data. Each front camera and rear camera can be a fixed optical lens system or have focal length and optical zoom capability.

The audio component 1010 is configured to output and/or input audio signals. For example, the audio component 1010 includes a microphone (MIC) configured to receive external audio signals when the terminal device 1000 is in operation modes, such as a call mode, a recording mode and a voice recognition mode. The received audio signal may be further stored in the memory 1004 or transmitted via the communication component 1016. In some embodiments, the audio component 1010 further includes a speaker for outputting audio signals.

I/O interface 1012 provides an interface between processing component 1002 and peripheral interface modules, which can be keyboards, click-wheels, buttons, etc. These buttons may include, but are not limited to, home button, volume button, start button and lock button.

The sensor component 1014 includes at least one sensor for providing various aspects of state evaluation for the terminal device 1000. For example, the sensor component 1014 can detect an ON/OFF state of the terminal device 1000, the relative positioning of components, such as the display and keypad of the terminal device 1000, the position change of the terminal device 1000 or a component of the terminal device 1000, the presence or absence of user contact with the terminal device 1000, the orientation or acceleration/deceleration of the terminal device 1000 and the temperature change of the terminal device 1000. The sensor component 1014 may include a proximity sensor configured to detect the presence of a nearby object without any physical contact. The sensor component 1014 may also include an optical sensor, such as a CMOS or CCD image sensor, for use in imaging applications. In some embodiments, the sensor component 1014 may further include an acceleration sensor, a gyro sensor, a magnetic sensor, a pressure sensor or a temperature sensor.

The communication component 1016 is configured to facilitate wired or wireless communication between the terminal device 1000 and other devices. The terminal device 1000 can access a wireless network based on communication standards, such as WiFi, 2G or 3G, or a combination thereof. In an embodiment, the communication component 1016 receives a broadcast signal or broadcast related information from an external broadcast management system via a broadcast channel. In an embodiment, the communication component 1016 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the terminal device 1000 can be realized by at least one application specific integrated circuit (ASIC), a digital signal processor (DSP), a digital signal processing device (DSPD), a programmable logic device (PLD), a field programmable gate array (FPGA), a controller, a micro-controller, a microprocessor or other electronic components, and is used for executing the method for distinguishing the paging capability of a base station in any one of the above-mentioned embodiments of FIGS. 1-6.

In an embodiment, there is also provided a non-transitory computer-readable storage medium including instructions, such as the memory 1004 including instructions, which can be executed by the processor 1020 of the terminal device 1000 to complete the above method. For example, the non-transitory computer-readable storage medium can be ROM, random access memory (RAM), CD-ROM, magnetic tape, floppy disk, optical data storage device, etc.

Figure 11:
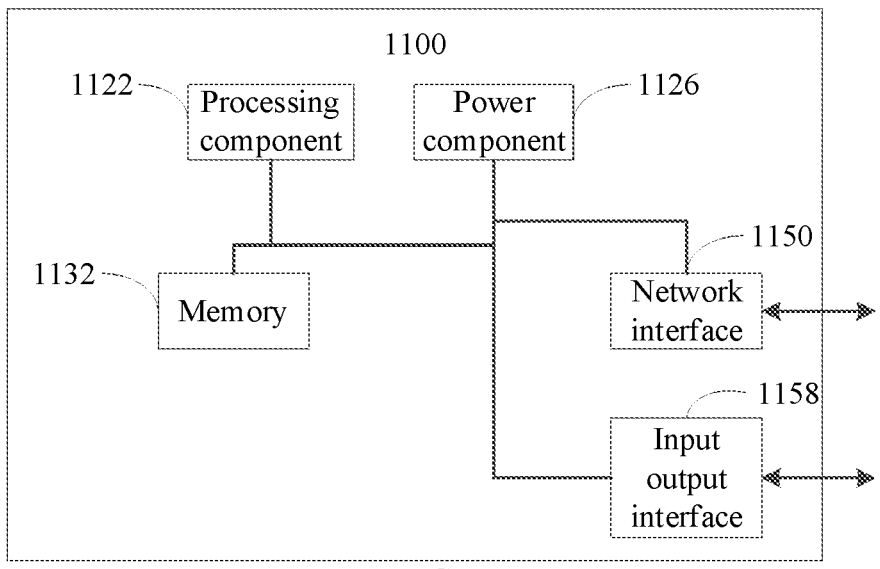
FIG. 11 is a schematic structural diagram of a base station provided by embodiments of the present disclosure.

As shown in FIG. 11, FIG. 11 is a schematic structural diagram of a base station provided by embodiments of the present disclosure. Referring to FIG. 11, the base station 1100 includes a processing component 1122, which further includes at least one processor, and memory resources represented by a memory 1132 for storing instructions (such as application programs) executable by the processing component 1122. The application program stored in the memory 1132 may include one or more modules each corresponding to a set of instructions. In addition, the processing component 1122 is configured to execute instructions to perform any of the aforementioned methods applied to the base station, for example, the method for distinguishing paging capability of a base station as shown in FIG. 7.

The base station 1100 may further include a power component 1126 configured to perform power management of the base station 1100, a wired or wireless network interface 1150 configured to connect the base station 1100 to a network, and an input/output (I/O) interface 1158. The base station 1100 can operate based on an operating system stored in the memory 1132, such as Windows Server™, Mac OS X™, Unix™, Linux™, FreeBSD™ or the like.

Those of ordinary skills in the art will easily think of other embodiments of the present disclosure after considering the specification and practicing the disclosure disclosed herein.

The present disclosure is intended to cover any variation, use or adaptation of the present disclosure, which follows the general principles of the present disclosure and includes common sense or common technical means in the technical field not disclosed in this disclosure. The specification and examples are to be regarded as exemplary only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

The invention claimed is:

1. A method for distinguishing paging capability of a base station, performed by a terminal device with multiple communication cards, comprising:

receiving paging signaling from the base station, wherein the paging signaling is for one of the multiple communication cards in a non-connected state in the terminal device;

in response to determining that the paging signaling comprises a paging cause information element, and the paging cause information element comprises a preset identifier and does not comprise a paging cause, wherein the preset identifier indicates the paging capability of the base station, and the paging cause comprises paging of multiple service levels of voice paging and non-voice paging, determining that the paging signaling is for non-voice paging; and in response to determining that the paging signaling comprises the paging cause information element, and the paging cause information element does not comprise the preset identifier and comprises the paging cause, and the paging cause is non-voice paging, determining that the paging signaling is for a non-voice service matching a service level indicated by the paging cause.

2. The method according to claim 1, further comprising:

determining the paging capability of the base station according to the paging cause information element;

wherein in response to determining that the paging signaling does not comprise the paging cause information element, determining the paging capability of the base station according to the paging cause information element comprises:

determining the paging capability of the base station according to received system information of the base station.

3. The method according to claim 2, wherein determining the paging capability of the base station according to the received system information of the base station comprises:

in response to determining, according to the received system information, that the base station is capable of sending the paging cause, and the paging signaling does not comprise the paging cause information element, determining that the base station is capable of sending the paging cause but does not send the paging cause.

4. The method according to claim 1, further comprising:

in response to determining that the base station is capable of sending the paging cause but does not send the paging cause, sending paging cause request information to the base station, so as to further request the base station to send the paging cause.

5. A communication device, comprising: a transceiver; a memory;

and a processor connected to the transceiver and the memory respectively, configured to execute a computer-executable instruction stored on the memory to control the transceiver to transmit and receive radio signals and perform acts according to claim 1.

6. A non-transitory computer storage medium storing a computer-executable instruction; wherein when the computer-executable instruction is executed by a processor, the processor performs acts according to claim 1.

7. A method for distinguishing paging capability of a base station, performed by the base station, comprising:

sending paging signaling to a terminal device with multiple communication cards;

wherein the paging signaling is for one of the multiple communication cards in a non-connected state in the terminal device, the terminal device determines that the paging signaling is for non-voice paging in response to determining that the paging signaling comprises a paging cause information element, and the paging cause information element comprises a preset identifier and does not comprise a paging cause, wherein the preset identifier indicates the paging capability of the base station, the paging cause comprises paging of multiple service levels of voice paging and non-voice paging; and wherein the terminal determines that the paging signaling is for a non-voice service matching a service level indicated by the paging cause in response to determining that the paging signaling comprises the paging cause information element, and the paging cause information element does not comprise the preset identifier and comprises the paging cause, and the paging cause is non-voice paging.

8. A communication device, comprising: a transceiver; a memory; and a processor connected to the transceiver and the memory respectively, configured to execute a computer-executable instruction stored on the memory to control the transceiver to transmit and receive radio signals and perform acts according to claim 7.

9. A non-transitory computer storage medium storing a computer-executable instruction; wherein when the computer-executable instruction is executed by a processor, the processor performs acts according to claim 7.

* * * * *